Patented Sept. 23, 1952

2,611,719

UNITED STATES PATENT OFFICE 2,611,719

BASE COATED WITH A HIGH STYRENE-BUTADIENE COPOLYMER

Alvin M. Borders, White Bear Lake, Minn., assignor to Wingfoot Corporation, Akron, Ohio, a corporation of Delaware No Drawing. Application September 21, 1946, Serial No. 698,434

7 Claims. (Cl. 117—161)

This invention relates to a dispersible resin prepared by the copolymerization of a vinyl aromatic monomer and a conjugated diene monomer, the vinyl aromatic monomer being present in an amount at least about 80%, and to coating compositions containing this dispersible resin.

It is well-known that rubber-like masses may be produced when a vinyl aromatic monomer, as for example, styrene, is copolymerized with a predominant amount of a diene, for example, 1,3-butadiene. Copolymers of this type have also been produced using a predominant amount of styrene, i. e., up to 70%, to produce a copolymer having an increased plasticity and solubility, as disclosed by Konrad and Ludwig in their U. S. Patent No. 2,335,124. Konrad also emphasizes that their product containing styrene within the distinct limits of 45–70% is capable of being dissolved in organic solvents, such as benzene, without the necessity of subjecting them to a mechanical breaking-down process and therefore they may be directly employed for coating purposes. Successful coating compositions are characterized by being highly resistant to abrasion and scrubbing forces, tough, high adhesion to the surface to which they are applied and hard without being brittle. Coating compositions containing a product of the type described by Konrad as a film-forming ingredient do not have these characteristics necessary in producing a successful coating composition.

It has been found that a butadiene-styrene copolymer containing at least 80% of styrene produces a coating composition which produces a film having excellent resistance to abrasion and scrubbing which is tough, is hard without being brittle and forms a strong bond with the coated surface. However, these copolymers, containing greater than about 80% of styrene, are difficultly dispersible in the dispersing mediums used in the preparation of coating compositions and require a great amount of mechanical breakdown in order to produce a resin which may be successfully used in the formulation of a coating. This necessary mechanical breakdown is uneconomical and destroys certain characteristics of the resin highly desirable in the production of a successful paint film.

It has now been discovered that a resin may be produced containing between about 80% and about 92% of styrene in copolymerized relationship with, for example, 1,3-butadiene, which is completely dispersible in the dispersing mediums such as toluene and xylene, normally used in the preparation of coating compositions, without the necessity of mechanically breaking down the resin. This dispersible resin is produced by carrying out the copolymerization reaction in the presence of a modifier capable of producing a dispersible resin.

It is preferred to produce the dispersible resin by the emulsion method. By this method, styrene is mixed with a modifier and emulsified with water and a catalyst capable of bringing about the copolymerization of the styrene and butadiene. Butadiene is then passed into this emulsion and the emulsion heated until the reaction is complete. The resinous particles are coagulated from the reaction mass in any suitable manner to produce a coagulum which is washed and dried to produce a product ready for use in the formulation of a coating composition.

A general and preferred method of bringing about the desired reaction between styrene and butadiene comprises dissolving dehydrogenated rosin acid in styrene at room temperature (70–75° F.) with stirring in a reactor, adding a mercaptan modifier, as, for example, dodecyl mercaptan, to the styrene solution, closing and evacuating the reactor while a water solution containing sodium hydroxide (which reacts with the dehydrogenated resin acid to form sodium dehydrogenated rosinate) and a catalyst are pumped into the reactor without agitation, and then charging 1,3-butadiene into the reactor. Polymerization is carried out by heating the emulsion at 110° F. to 150° F. while stirring, for about 10 to about 18 hours or until the percent solids ranges from about 35 to about 40% and a minimum agglomeration temperature of about 145° F. has been reached. The agglomeration temperature is determined by coagulating a small quantity of diluted latex containing 10–15% solids in a cold 0.04% sulfuric acid solution with sufficient agitation to obtain small resin particles and by heating the slurry, while stirring, 3° F. per minute, until the resin particles form one mass. The temperature that the resin particles coalesce to one mass is the agglomeration temperature.

An antioxidant is not necessary but may be added to this reaction mass as a well-dispersed suspension in an amount between about 0.1 and about 1.0% on the total solids. Coagulation is accomplished by running a small stream of the latex into a vigorously agitated sulfuric acid solution (0.04%) or any other suitable coagulating medium. The resin is then agglomerated to the desired particle size by means of the addition of steam. The agglomerated mass is washed with cold water to remove water soluble components.

Suitable catalysts that may be used as an aid in bringing about the copolymerization are potassium persulfate, benzoyl peroxide, hydrogen peroxide, perborates and percarbonates. In general, the oxygen generating catalysts are successfully used in this reaction. The catalysts may be used in an amount about 0.01% and about 1.0%, and preferably are used in an amount between about 0.1% and about 0.5%.

Typical emulsifiers are those which may be generally referred to as the fatty acid soaps, as, for example, sodium stearate and the rosin acid soaps, as, for example, sodium rosinate; alkali metal salts of alkyl sulfuric acid esters, as, for example, sodium lauryl sulfate; alkali metal salts of alkyl aryl sulfonates, as, for example, sodium dodecyl benzyl sulfonate. Tallow soap is also useful. These emulsifiers may be added as such or the necessary reacting components may be added to the water phase in such a manner as to form the emulsifier in situ. The emulsifier may be present in an amount between about 1.5% and an amount necessary to bring about the proper suspension of the reacting materials and to form the proper emulsion. The upper limit may be as high as about 10% of emulsifier. A more desirable range of concentration of emulsifier is between about 3% and about 5%. Water is present in an amount based upon the total amount of monomers being reacted and may be used in a monomer/water ratio between about 100/60 to about 100/200. A preferred monomer water range is between about 100/180 and about 100/200.

Generally, the copolymerization is carried out at a temperature between about 68° F. and about 158° F. for a period of between about 4 hours and about 100 hours, depending upon the percent conversion desired and depending upon the charged monomer ratio, the catalyst used, and the type of monomers present.

The copolymerization reaction is carried out in any suitable reaction chamber during constant stirring until the desired percent hydrocarbon conversion has been obtained and then the reaction may be stopped by the addition of an antioxidant which also serves as a means of preserving the end product against degradation by oxidation. Any suitable antioxidant may be added, as, for example, phenyl-beta-naphthylamine, the alkylated polyhydroxy phenols, the carbon substituted diaryl amines, the ditolyl amines and dibetanaphthyl-para-phenylene-diamine.

The resulting latex may be coagulated by the addition of an alcohol, as for example, methyl alcohol, isopropyl alcohol, etc. Commercial alum is also a desirable coagulant. Another desirable coagulant is a mixture of an acid and a salt, and particularly sulfuric acid and sodium chloride. Coagulation may also be brought about by the addition of a salt and alcohol mixture in which the salt is sodium chloride and the alcohol is methyl alcohol. Coagulation may also be effected by the addition of barium chloride alone, or barium chloride in admixture with an acid, magnesium chloride alone, calcium chloride alone, and mechanically by means of reducing the temperature of the latex to a point where the polymer particles drop out of the latex.

The copolymer of this invention is produced directly in its dispersible form by copolymerizing the monomers in the manner just described only when using at least a minimum amount of a modifier. Generally, the greater the percentage of butadiene used, the greater is the amount of modifier that must be used in order to produce a completely dispersible product.

The amount of modifier that must be used in order to produce a completely benzene-dispersible resin depends in part upon the particular modifier being used, upon the amount of material being reacted, and upon the method used in carrying out the reaction. In all cases, however, it has been found that the desired dispersibility characteristic is possessed by the resin when at least 2.5 to 3.0% modifier is used. Amounts greater than 3.0% will in all cases produce a completely dispersible product.

The viscosity of a disperse system containing the resin is dependent in part upon the monomer ratio being used and in part upon the amount and type of modifier employed. Highly desirable results are obtained in the formulation of, for example, a coating composition when using a dispersible resin produced from a reaction mixture containing a butadiene/styrene ratio of 15/85 and using at least about 1.0 to 2.5 parts of modifier. Under these conditions the dispersible resin has a viscosity of approximately 35 seconds, using the No. 4 Ford Cup in 20% xylene dispersion measured at 78° F. It has been observed that the amount of modifier necessary to obtain a desired viscosity varies somewhat with the type of reactor used. For example, a charge comprising 100 parts of the monomers in 15/85 ratio, 180 parts of water, 5 parts of sodium dehydrogenated rosinate and 0.3 part of potassium persulfate and reacted at 125° F. until 95% conversion was obtained, had a No. 4 Ford Cup viscosity in 20% xylene dispersion at 78° F. of 35 seconds when reacted in a 5 gallon reactor in the presence of 1.12% dodecyl mercaptan modifier and rocked during the reaction period. However, if the same charge was stirred, then it was necessary to react the mixture in the presence of 1.6% of the dodecyl mercaptan modifier in order to get the 35 second viscosity resin, and 2.3% dodecyl mercaptan modifier was necessary when using the same stirring method, but reacting a 200 gallon charge.

The modifiers that may be used in the production of a completely benzene-dispersible resin are those generally referred to as mercaptans containing at least 6 carbon atoms and particularly such mercaptans as isohexyl mercaptan, octadecyl mercaptan, dodecyl mercaptan, the tertiary alkyl mercaptans such as tertiary dodecyl mercaptan, etc. These mercaptan modifiers may be added in an amount between about 0.2 part to about 3.0 parts per 100 parts of monomers being reacted. The maximum amount of modifier that should be added regardless of the conditions of reaction, is 3.0 parts per 100 parts of monomers. The use of greater amounts is not economical. As stated before, the minimum amount of modifier to be used is dependent in part upon the monomer ratio being used, the modifier being used and the method of reaction. Generally, it might be stated that a butadiene/styrene ratio of 8/92 requires a modifier concentration of at least 0.2 part and that as the amount of styrene is decreased in the ratio, the amount of modifier is increased so that in a butadiene/styrene ratio of 20/80, the minimum modifier concentration is about 0.8 part.

It has been observed that a wide range of viscosities of the product may be obtained, and it has been found that viscosities ranging from about 19 seconds to about 1000 seconds, No. 4

Ford Cup, may be produced by the proper selection of butadiene/styrene ratio and modifier concentration. The following table shows what viscosities may be obtained when using the conditions indicated:

TABLE I

*Viscosities of varying ratios of butadiene/styrene resins with different modifier concentrations using tertiary dodecylmercaptan as the modifier*

| Butadiene/ Styrene Ratio | Modifier Concentrations | | | | | | | | |
|---|---|---|---|---|---|---|---|---|---|
| | 0.2 | 0.4 | 0.6 | 0.8 | 1.0 | 1.2 | 1.4 | 1.6 | 1.8 |
| 8/92 | 300 | 98 | 48 | 37 | 24 | 19 | <19 | <19 | <19 |
| 10/90 | 348 | 90 | 47 | 29 | 22 | 21 | <21 | <21 | <21 |
| 12/88 | 960 | 135 | 65 | 36 | 26 | 22 | <22 | <22 | <22 |
| 14/86 | 540 | 175 | 85 | 46 | 25 | 24 | 20 | <20 | <20 |
| 16/84 | gel | 161 | 49 | 45 | 33 | 24 | 20 | 19 | <19 |
| 18/82 | gel | 720 | 210 | 86 | 50 | 35 | 24 | 20 | <20 |
| 20/80 | gel | gel | gel | 135 | 60 | 35 | 26 | 24 | 19 |

Values in table=Ford Cup (#4 orifice) viscosity of 20% resin in xylene dispersions at 78° F.

The dispersible resin may be generally characterized as being a thermoplastic, non-oxidizing synthetic copolymer having a softening point range between about 45° C. and about 55° C., highly resistant to moisture, acids, alkalis and other corrosive chemicals. In addition to these characteristics, it has been discovered that this dispersible resin may be formulated to produce a fast drying protective coating having exceptional film-forming properties. Protective coating compositions containing this dispersible resin have been found to possess excellent color and clarity. There is also a tendency for the unpigmented formulations to bleach in the sunlight in contrast to yellowing often observed with other film formers. This bleaching is an exceptionally unexpected characteristic in resins of this type. This resin is also resistant to yellowing in the dark or sunlight. The coatings show an absence of objectionable paint odor, and are non-toxic. Dispersions will tolerate considerable dilution with cheap petroleum dispersing mediums without the tendency for the resin to separate out of dispersion. The coatings have low dispersing medium retention. Coatings for spray application can be formulated to dry in less than 10 minutes. Coatings that may be applied easily by brushing can be formulated to dry in less than 2 hours. The coating compositions dry by evaporation to a firm, flexible film and do not require an oxidation period. The films are characterized as being non-saponifiable, resistant to acids, alkalis, soaps and corrosive influences in general, highly resistant to water and moisture vapor, alcohol, vegetable, animal and mineral oils and greases, highly resistant to abrasion and scrubbing, are very tough, and produce an outstanding adhesive bond with the surface being coated, and possess good ageing characteristics. The dispersible resin possesses good thermal stability and withstands mixing on a 2-roll mill as well as baking.

In view of these properties possessed by the finished protective film, the dispersible resin may be used in the formulation of acid and alkali resistant coatings, concrete floor enamels, architectural finishes, metal primers and finishes, oil and grease resistant coatings, baking primers and enamels, ship bottom paints or marine paints, house paints, trim paints, paints and enamels for interior use, lacquers, and printing inks.

A typical dispersible resin made by polymerizing a mixture of 1,3-butadiene/styrene in 15/85 ratio has the following specific properties:

Specific gravity _____ 1.03
Softening point _____ 50° C.
Tensile strength _____ 1450 p. s. i.
Elongation _____ 0.0%
Iodine number _____ 57.8
Acid value _____ Neutral
Color:
   Resin powder _____ White
   Milled resin _____ Light amber
   Dispersion _____ Very pale amber
   Film _____ Clear and colorless
Index of refraction _____ 1.585
Viscosity _____ Can be varied to meet requirements.

Since the dispersible resin is thermoplastic and has good thermal stability, pigments may be dispersed in it by plastic mixing on a differential speed 2-roll mill or in an internal-type mixer such as a Banbury. This method of dispersing pigments is much more efficient and effective than the conventional wet grinding procedures conventionally employed in the paint industry. Electron microscope studies of carbon blacks and other ultra-fine pigments incorporated into the dispersible resin in this manner show the pigment to be uniformly and completely dispersed. Such uniform dispersion of pigment results in a film having high gloss. This pigmented dispersible resin may be referred to as a resin base, and the following bases may be compounded:

TABLE II

*Resin bases*

| Percent Dispersible Resin | Percent Pigment or Extender |
|---|---|
| 35 | 65 Titanium Dioxide. |
| 35 | 65 Titanium Calcium Pigment. |
| 25 | 75 Titanium Barium Pigment. |
| 30 | 70 Zinc Oxide. |
| 20 | 80 Red Lead. |
| 40 | 60 Indian Red Oxide. |
| 40 | 60 Zinc Chromate. |
| 35 | 65 Diatomaceous Silica. |
| 35 | 65 Magnesium Carbonate. |
| 30 | 70 Whiting, Precipitated. |
| 40 | 60 China Clay. |
| 30 | 70 Lithopone. |
| 30 | 70 Zinc Sulfide. |
| 80 | 20 Prussian Blue. |
| 80 | 20 C. P. Toluidine Toner, Medium. |
| 40 | 60 Yellow Iron Oxide. |
| 77 | 23 C. P. Chrome Green, Medium. |
| 35 | 65 C. P. Chrome Yellow, Medium. |
| 40 | 60 Black Iron Oxide. |
| 50 | 50 Lampblack. |
| 30 | 70 High Zinc Sulfide Lithopone. |
| 25 | 75 Molybdate Orange Dark. |
| 40 | 60 C. P. Chrome Yellow, Extra Light. |

When these resin bases are mixed with a dispersing medium such as high flash aromatic naphtha, the resin disperses, releasing the pigments in a highly dispersed condition ideally suitable for use in the formulation of protective coatings. These bases are stable on ageing, and do not change in solubility or viscosity. Coatings made from these bases have excellent suspension characteristics.

The dispersible resin in powder or pellet form is readily dispersed in a variety of the commonly used paint and lacquer dispersing mediums, and coatings of any desired drying rate may be formulated. The aromatic hydrocarbon or petroleum naphthas with high aromatic content, for example, benzene and xylene, are the most satisfactory dispersing mediums for use in the formulation of surface coatings with the dispersible resin. Dispersions of the dispersible resin will tolerate dilution with cheap petroleum thinners, as, for example, mineral spirits, up to 50% by weight of the total dispersion medium content, without causing the precipitation of the resin.

Dispersions of the dispersible resin are very stable and do not change in viscosity on ageing. They are also chemically neutral and do not react with pigments even on long storage.

The following dispersing mediums produce a low viscosity dispersion with the dispersible resin in 20% concentration. Examples of aromatic hydrocarbons are benzene, toluene, xylene, and high flash naphtha. Examples of dispersing agents of esters are amyl acetate, butyl acetate, ethyl acetate, and Cellosolve acetate. Examples of ketones are methyl ethyl ketone, methyl n-amyl ketone, and methyl isobutyl ketone. Examples of terpene hydrocarbons are dipentene and turpentine. An example of a nitro-paraffin is 1-nitropropane. Medium viscosity dispersion in 20% concentration may be made with chlorinated hydrocarbons, for example, ethylene dichloride and monochlorobenzene.

The hardness and flexibility of coatings containing the dispersible resin can be varied to meet specific requirements by the use of various plasticizers and by modification with other resins. For most applications, only a small amount of plasticizer is required and very satisfactory results have been obtained with some of the drying oils such as raw tung, perilla, and pale grinding high acid value linseed when used in combination with chlorinated paraffin (40% chlorine content) in the proportion of 5 parts of oil and 10 parts of chlorinated paraffin per 100 parts of dispersible resin.

The dispersible resin is compatible with such plasticizers as chlorinated diphenyl, chlorinated paraffin, diamyl naphthylene, dibutyl phthalate, dioctyl phthalate, Hercolyn (hydrogenated methyl abietate), Kapsol (methoxy glycol oleate), Kronisol (butoxy glycol phthalate), KP-23 (butoxy glycol stearate), Methox (methoxy glycol phthalate), Santicizer B-16 (butyl phthalyl butyl glycollate) and tricresyl phosphate. The dispersible resin is also compatible with varnishes containing linseed and cumar in both 12½ and 25 gallon lengths and varnishes containing linseed and Amberol as well as being compatible with the cumarone-indene oils and resins.

Protective coatings containing the dispersible resin may be prepared by using a dispersion of the dispersible resin powder as the vehicle. Pigments may be ground into these dispersions by the conventional methods, and coatings formulated in the usual manner. Since pigment dispersion in the dispersible resin prepared by plastic milling is considerably better than can be obtained by wet grinding, the use of the pigmented bases is to be preferred in most formulations, and particularly so in gloss finishes as, for example, the enamels. The superior pigment dispersion when using the dispersible resin bases gives excellent suspension and permits the use of higher pigment loading in gloss finishes, resulting in increased covering capacity and reduced formulation cost. In addition to this, the convenience of formulating coatings with these dispersible resin pigmented bases and the simplicity of the process and equipment required for dispersion of bases in the plant, further recommend their use.

Resin bases can be cut in a dispersion medium by any of the following procedures. To expedite the process, aromatic hydrocarbon agents, such as toluene, xylene or high flash naphtha, should be used for the initial dispersion, after which petroleum agents, such as mineral spirits, can be used for dilution:

(1) Simple agitation by means of a stirring device or by rolling or tumbling in a drum until the resin has completely dispersed and the mixture is smooth and free from lumps and specks. A pebble mill, with or without pebbles, can also be used for this purpose.

(2) Simple agitation as above until the material has softened and then passing through a stone mill or a 3-roll mill to complete the dispersion of the resin. This method is considerably more rapid than continuing the agitation until the dispersion is complete.

(3) By using a paste or dough mixer. A sufficient amount of dispersing medium to form a heavy paste is mixed with the dispersible resin base and agitation continued until the batch is smooth. This can be accomplished in 3-4 hours by keeping the paste sufficiently stiff to develop a temperature of at least 150° F. due to frictional heat. The batch is then diluted to pouring consistency and transferred to a mixing tank where the balance of the ingredients are added to complete the formulation.

The resin of this invention is directly produced in dispersible form and is miscible in all proportions with the dispersing medium. For example, where sufficient dispersing medium is used to form a continuous phase, a system is produced having submicroscopic particles of the resin distributed throughout the medium. Lesser amounts of medium have a plasticizing effect on the resin. The systems disclosed by the examples below are those in which the continuous phase is the dispersing medium and it is in this form that the resin finds its greatest use in the protective coating field.

In the preparation of an acid and alkali resistant coating, the resistance of a pigmented finish to corrosive agents is dependent upon the resistance of the pigment as well as the binder. Therefore, pigments must be chosen carefully. The dispersible resin is highly resistant to acids and alkalis and when used with the proper pigments produces very resistant coatings.

Among the black pigments, the various forms of carbon are the most resistant to attack by both acids and alkalis. Among the extender pigments, aluminum silicate (clay) has been found to be the most resistant to acids and alkalis and gives the most impervious films.

EXAMPLE 1

*Acid and alkali resistant coating*

|  | Percent by weight | Lbs. per 100 gal. |
|---|---|---|
| Dispersible Resin Base [1] | 26.28 | 224.8 |
| Dispersible Resin Base [2] | 15.76 | 134.7 |
| Chlorinated paraffin [3] | 1.84 | 15.8 |
| Raw Tung Oil | 0.92 | 7.9 |
| High Flash Aromatic Naphtha | 27.6 | 235.9 |
| Petroleum Thinner | 27.6 | 235.9 |
| Total | 100.0 | 855.0 |

[1] 40% Dispersible resin, 60% China clay.
[2] 50% Lampblack, 50% dispersible resin.
[3] 40% Chlorine content.

This formulation has a solids content of 44.8 and a weight per gallon of 8.55 pounds. Films of this material 0.0025 inch in thickness were unaffected after immersion in the following ingredients for six months:

3% acetic acid
10% sulfuric acid
10% hydrochloric acid
10% nitric acid
29% ammonium hydroxide
10% sodium hydroxide
50% sodium hydroxide
Mineral oil
Vegetable oil The resistance of a surface finish to various reagents is determined by placing drops of the reagents on iron or steel panels coated with the finish and examining the film from time to time. If the reagent does not soften the film, or cause it to become brittle or lose adhesion, or have any other deleterious effects on the film, the finish is considered to be resistant to that reagent.

A satisfactory concrete floor enamel must have the following qualities:

(1) Alkali and water resistance. The vehicle must be non-saponifiable to resist the action of alkalis in the concrete and in the commonly used cleansers.
(2) Good adhesion.
(3) Good resistance to abrasion.
(4) Sufficient hardness to resist marring and grinding-in of dirt and grit.

The following concrete floor enamel formulations meet the above requirements. Although they are intended particularly for use on floors, they can also be used on concrete, brick, and plaster walls.

EXAMPLE 2

*Concrete floor enamel tile red*

| | Percent by weight | Lbs. per 100 gal. |
|---|---|---|
| Dispersible Resin Base [1] | 19.65 | 181.5 |
| Dispersible Resin Base [2] | 27.53 | 254.4 |
| Chlorinated Paraffin [3] | 1.88 | 17.4 |
| Drying Oil [4] | 0.94 | 8.7 |
| High Flash Aromatic Naphtha | 15 | 231.0 |
| Petroleum Thinner | 25.00 | 231.0 |
| Total | 100.00 | 924.0 |

[1] 40% Dispersible resin, 60% Indian red iron oxide.
[2] 40% Dispersible resin, 60% China clay.
[3] 40% Chlorine content.
[4] Raw tung oil, perilla, or pale grinding linseed.

This formulation produces a coating having a solids content of 50% and a weight per gallon of 9.24 pounds.

EXAMPLE 3

*Concrete floor enamel light gray*

| | Percent by weight | Lbs. per 100 gal. |
|---|---|---|
| Dispersible Resin Base [1] | 22.25 | 198.60 |
| Dispersible Resin Base [2] | 18.11 | 161.70 |
| Dispersible Resin Base [3] | 0.65 | 5.80 |
| Dispersible Resin Base [4] | 0.28 | 2.50 |
| Dispersible Resin Base [5] | 0.32 | 2.86 |
| Chlorinated Paraffin [6] | 1.46 | 13.03 |
| Drying oil [7] | 0.73 | 6.51 |
| High Flash Aromatic Naphtha | 28.10 | 251.00 |
| Petroleum Thinner | 28.10 | 251.00 |
| Total | 100.00 | 893.00 |

[1] 35% Dispersible resin, 65% titanium dioxide.
[2] 40% Dispersible resin, 60% China clay.
[3] 40% Dispersible resin, 60% yellow iron oxide.
[4] 77% Dispersible resin, 23% C. P. chrome green medium.
[5] 50% Dispersible resin, 50% lampblack.
[6] 40% Chlorine content.
[7] Raw tung oil, perilla, or pale grinding linseed.

This formulation has a solids content of 43.8% and a weight per gallon of 8.93 pounds.

Although the invention has been described particularly with respect to the use of 1,3-butadiene and styrene, other conjugated diene hydrocarbon monomers and other vinyl aromatic monomers may be used.

The conjugated diene hydrocarbon monomer of the resin of this invention may be also referred to as a conjugated diolefin and by this term is meant those unsaturated hydrocarbons of open chain or cyclic character which possess two olefinic linkages embraced in the characteristic group C=C—C=C. Representative suitable di-olefins are butadiene-1,3, isoprene, 2,3-dimethyl butadiene-1,3, 2-ethyl butadiene-1,3, 1,3-dimethyl butadiene-1,3, pentadiene-1,3, 3-methyl pentadiene-2,4, 3,4-dimethyl pentadiene-2,4, the straight chain, branched chain and cyclic hexadienes, heptadienes, and homologs, analogs and hydrocarbon substitution products. The preferred conjugated diolefin is butadiene-1,3, although any of the other conjugated diolefins will produce comparable results.

Examples of the vinyl aryl substituent of the resin of this invention are styrene, substituted styrene as, for example, ortho meta and para chlorostyrenes, isomeric ring-substituted dichlorostyrene, alkyl styrene, for example, methyl styrene, isopropyl styrene, etc.

This application is a continuation-in-part application of my application Serial No. 619,875, filed October 2, 1945.

Suitable changes may be made in the details of the process without departing from the spirit or scope of the present invention, the proper limits of which are defined in the appended claims.

I claim:

1. A base coated with a flexible, tough, continuous, clear film of a resinous, thermoplastic, emulsion-polymerization copolymer of 80 to 92% of styrene and from 20 to 8% of a conjugated diolefin of from 4 to 6 carbon atoms per molecule prepared in the presence of from 0.2 part to about 3.0 parts per 100 parts of monomers of a mercaptan modifier of at least 6 carbon atoms, the film resulting from the evaporation of the solvent from a dispersion of said copolymer in an organic solvent for said copolymer, a 20% xylene solution of the resin having a No. 4 Ford Cup viscosity at 78° F. of from less than 19 to not more than 960 seconds.

2. A base coated with a flexible, tough, continuous, clear film of a resinous, thermoplastic, emulsion-polymerization copolymer of 80 to 92% of styrene and from 20 to 8% of butadiene-1,3 prepared in the presence of from 0.2 part to about 3.0 parts per 100 parts of monomers of a mercaptan modifier of at least 6 carbon atoms, the film resulting from the evaporation of the solvent from a dispersion of said copolymer in an organic solvent for said copolymer, a 20% xylene solution of the resin having a No. 4 Ford Cup viscosity at 78° F. of from less than 19 to not more than 960 seconds.

3. A base coated with a flexible, tough, continuous, clear film of a resinous, thermoplastic, emulsion-polymerization copolymer of 80 to 92% of styrene and from 20 to 8% of butadiene-1,3 prepared in the presence of from 0.2 part to about 3.0 parts per 100 parts of monomers of a mercaptan modifier of at least 6 carbon atoms, the film resulting from the evaporation of the solvent from a dispersion of said copolymer in an aromatic hydrocarbon solvent for said copolymer, a 20% xylene solution of the resin having a No. 4 Ford Cup viscosity at 78° F. of from less than 19 to not more than 960 seconds.

4. A base coated with a flexible, tough, continuous, clear film of a resinous, thermoplastic, emulsion-polymerization copolymer of 85% of styrene and 15% of butadiene-1,3 prepared in the presence of from 0.2 part to about 3.0 parts per 100 parts of monomers of a mercaptan modifier of at least 6 carbon atoms, the film resulting from the evaporation of the solvent from a dispersion of said copolymer in an aromatic hydrocarbon solvent for said copolymer, a 20% xylene solution of the resin having a No. 4 Ford Cup viscosity at 78° F. of from less than 19 to not more than 960 seconds.

5. A base coated with a flexible, tough, continuous film containing a pigment and a resinous, thermoplastic, emulsion-polymerization copolymer of 80 to 92% of styrene and 20 to 8% of a conjugated diolefin of from 4 to 6 carbon atoms per molecule prepared in the presence of from 0.2 part to about 3.0 parts per 100 parts of monomers of a mercaptan modifier of at least 6 carbon atoms, a 20% xylene solution of the resin having a No. 4 Ford Cup viscosity at 78° F. of from less than 19 to not more than 960 seconds.

6. A base coated with a flexible, tough, continuous film containing a pigment and a resinous, thermoplastic, emulsion-polymerization copolymer of 80 to 92% of styrene and 20 to 8% of butadiene-1,3 prepared in the presence of from 0.2 part to about 3.0 parts per 100 parts of monomers of a mercaptan modifier of at least 6 carbon atoms, a 20% xylene solution of the resin having a No. 4 Ford Cup viscosity at 78° F. of from less than 19 to not more than 960 seconds.

7. A base coated with a flexible, tough, continuous film containing a pigment and a resinous, thermoplastic, emulsion-polymerization copolymer of 85% of styrene and 15% of butadiene-1,3 prepared in the presence of from 0.2 part to about 3.0 parts per 100 parts of monomers of a mercaptan modifier of at least 6 carbon atoms, a 20% xylene solution of the resin having a No. 4 Ford Cup viscosity at 78° F. of from less than 19 to not more than 960 seconds.

ALVIN M. BORDERS.

REFERENCES CITED

The following references are of record in the file of this patent:

UNITED STATES PATENTS

| Number | Name | Date |
| --- | --- | --- |
| 2,281,613 | Wollthan | May 5, 1942 |
| 2,393,157 | Gleason et al. | Jan. 15, 1946 |
| 2,393,208 | Waterman | Jan. 15, 1946 |
| 2,418,782 | Mark | Apr. 8, 1947 |
| 2,425,840 | Schulze | Aug. 19, 1947 |
| 2,456,647 | Rehberg | Dec. 21, 1948 |
| 2,477,316 | Sparks | July 26, 1949 |
| 2,526,654 | Gleason et al. | Oct. 24, 1950 |

FOREIGN PATENTS

| Number | Country | Date |
| --- | --- | --- |
| 456,442 | Great Britain | Aug. 8, 1935 |